June 11, 1946.    J. B. KENDRICK    2,401,873
INDICATOR FOR RADIO CONTROLLED AIRPLANES
Filed Nov. 22, 1940
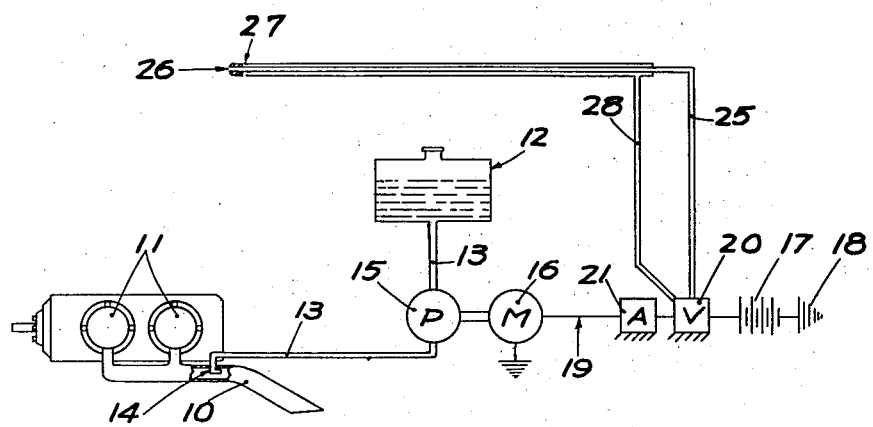
FIG-I
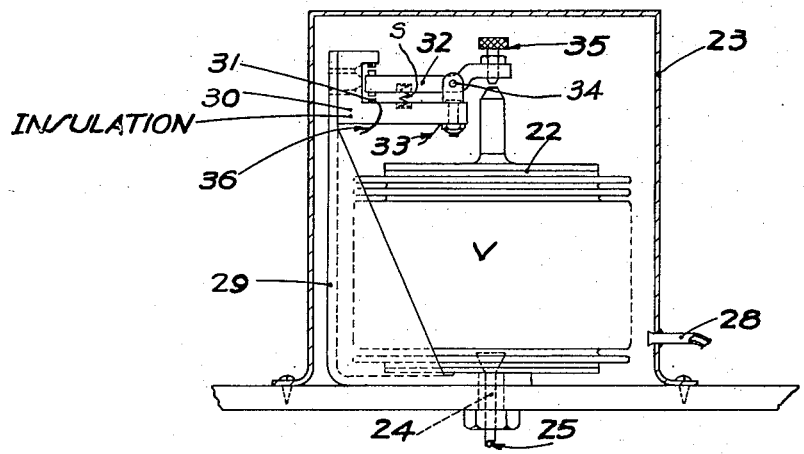
FIG-II
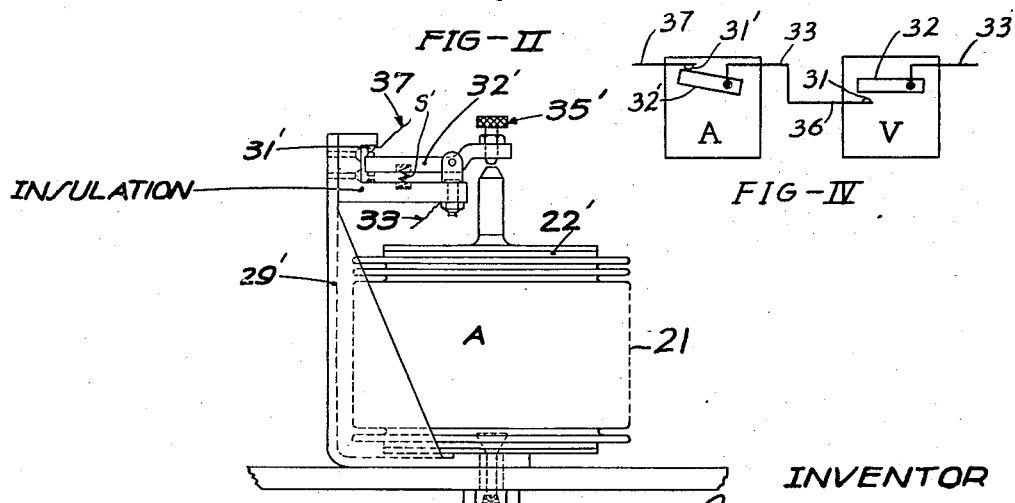
FIG-III    FIG-IV
INVENTOR
James B. Kendrick Patented June 11, 1946

2,401,873

UNITED STATES PATENT OFFICE 2,401,873

INDICATOR FOR RADIO CONTROLLED AIRPLANES

James B. Kendrick, Glendale, Calif., assignor, by mesne assignments, to Lockheed Aircraft Corporation, a corporation of California Application November 22, 1940, Serial No. 366,628

3 Claims. (Cl. 244—1)

This invention relates to the provision of a visual indication of the attainment of a desired critical altitude and airspeed on the part of a remotely controlled robot airplane.

Such robot airplanes have been proposed for use as targets, torpedo carriers, or for dangerous photographic missions wherein it is not desired to risk the life of a pilot therein; and of necessity must be controlled from great distances, approaching the limit of visibility even with the aid of powerful aids to vision. At such distances it is extremely difficult to estimate the altitude and air speed of the robot plane, and it is an object of this invention to provide visual indications, automatically produced by the robot plane, to respond to adequate air speed and as a limitation of the desired altitude of flight, thus providing the operator with a visual signal of the normal or desired functioning of the robot plane in response to radio signals delivered by the operator.

It is a further object of this invention to provide an automatic visual signal system of the type described that will release a smoke trail during normal and desired flight conditions but will cut off the smoke as the airplane slows down to stalling speed, or rises above a predetermined altitude, as a warning to the operator.

It is also an object of this invention to provide an automatically responsive signal system operated by the motion and altitude of a robot plane independently of the remote control thereof, whereby to provide a signal system unaffected by control impulses transmitted to the airplane.

It is another object of this invention to make the airplane and its flight path visible at great distance as an aid to the ground pilot or operator.

It is another object of this invention to provide a simple and self-contained automatic control of a smoke discharging apparatus that can be applied to various purposes without requiring the attention or presence of an operator.

Other and further important objects of this invention will be apparent from the disclosures in the specification and the accompanying drawing.

This invention in its preferred form is illustrated in the drawing and hereinafter more fully described.

A preferred form of this invention is shown diagrammatically in the drawing, wherein:

Figure I is a diagrammatic showing of a smoke producing mechanism and an altitude and velocity control therefor.

Figure II is an enlarged detail of the velocity responsive control.

Figure III is an enlarged detail of the altitude control.

Figure IV is a detailed view, conventional form, of the series circuit connection through controls A and V of Figure I when the airplane is grounded.

As shown:

The smoke trail system disclosed in the drawing is intended for use in an internal combustion engine driven plane, wherein an exhaust pipe 10 leading from engine cylinders 11 is utilized to vaporize and eject a suitable liquid, which liquid will preferably be chosen for its smoke producing and lasting properties, such as is used in skywriting, for example. I have found that a mixture of ten parts flushing oil and one part carbon tetrachloride produces satisfactory results, but I do not desire to limit myself to such a mixture. The liquid system comprises a tank 12 with a pipe 13 feeding the liquid to an injection orifice 14 in the engine exhaust pipe 10, a pump 15 driven by an electric motor 16 serving to control the supply of liquid. A combination pump and motor such as the autopulse is especially convenient, but other forms of pumps which will both feed and control the flow of liquid, can be used with an elevated tank. It is not necessary to have the tank elevated as shown, although if so arranged the pump should obstruct the flow of liquid when not in operation.

The pump 16 is arranged to be driven by the usual electrical system of the airplane, in this case shown as a battery 17, one terminal of which is grounded at 18. A wire 19 leads from the battery to a switch 20 controlled by the air speed or velocity of flight, thence to an altitude controlled switch 21, and thence to the motor 16.

The air speed or velocity responsive control 20, which has been marked "V" in Figure I for identification, comprises a sensitive bellows 22 in an air tight case 23, the interior of the bellows being connected at 24 to the velocity passages 25 of a Pitot tube 26, while the exterior of the bellows is connected to the static passage 27 of the Pitot tube by a connection 28 to the airtight case. With this arrangement the bellows expands in proportion to the air speed or velocity to which the Pitot tube is exposed. A bracket 29 supports an insulated block 30 having a contact 31 adjacent which a beam 32 is pivoted, the beam having an electrical connection 33 through its pivot point 34 and being arranged with an adjusting screw 35 positioned to be contacted by an element carried by the expanding bellows. Normally, as shown in Fig. II, the spring S maintains beam 32 in a central circuit opening position.

If it is desired to have the electrical circuit closed at all air speeds above a predetermined or critical one, it is only necessary to include the contact 31 in the circuit as indicated by the terminal connection 36, so that connections 33 and 36 are closed by the downward movement of the beam 32, these connections being part of the circuit 19.

The altitude responsive control 21 requires no case or pressure connections, but is otherwise identical with that previously described, except that the fixed contact 31' is normally maintained closed by a constant upward bias on the spring s' to close the circuit through the connection 37 if the smoke trail is to be produced below a given altitude at which this contact is opened by the expansion of the gas or air within the bellows 22.

By selecting a bellows having a motion of approximately eight thousandths of an inch for a hundred foot change in altitude, with a corresponding movement of twenty thousandths for a five mile per hour change in speed, I have found that an allowable beam movement of sixteen thousandths for the altitude control and forty thousandths for the air speed control will give satisfactory sensitivity of the order mentioned. By a suitable adjustment of the screws 35—35' it is possible to adjust the closing or opening movements of the contacts for a predetermined air speed and altitude.

In the operation of my invention, assuming it is desired to provide a smoke trail at all air speeds above a selected value and at all altitudes below the selected altitude, the set up will be as first described, namely using the contact 31 of the airspeed control and the contact 31' of the altitude control. With the altitude bellows sealed at sea level, its expansion will be in proportion to altitude, and the air speed control will expand in proportion to the net velocity head on the Pitot tube, so that both bellows will close their circuits, which are in series in the electrical connection 19 between the battery and motor, under the desired operating conditions, operating the motor pump combination to inject fluid into the exhaust pipe 10. For better vaporization of the smoke producing fluid, it is desirable to lag or cover the exhaust pipe with asbestos or the like.

The contact 31' will remain closed until the craft rises above a desired cruising altitude. If we assume after take-off a climbing speed of 80 M. P. H., in case the speed reaches 120 M. P. H. (the desired cruising speed) during its climb, the contact 31 will be closed and a smoke indication is produced. The operator will then nose up the craft to drop the speed below 120 M. P. H. to prevent smoke from forming. A desired operation depends mainly upon the "feel" of the operator and his skill with the controls. It will be a simple matter for the operator to produce intermittent smoke signals during ascent by increasing and decreasing the speed. When the desired altitude is reached and exceeded, the altitude contact 31' will open with the result that no smoke signal will be produced. The operator by his knowledge of approximate previous speed and by his exercise of the "feel" of his remote controls may vary the speed and altitude to maintain the smoke indication more or less continuous at a normal cruising speed and altitude.

It will be evident that instead of using both altitude and air speed controls in series they can be used to discharge separate smoke trails, which might be of different color for identification purposes, an especially easy arrangement in the case of flat or opposed cylinder engines having separate exhaust pipes on either side of the fuselage.

It will thus be seen that I have invented a novel smoke signal device to provide a visual indication of the flight path of a remotely controlled mechanism, such as a robot airplane, at a predetermined altitude and airspeed. Such a signal device might also be used for remotely controlled torpedo boats, to indicate speed and/or other critical functions thereof.

Having thus described my invention and the present preferred embodiment thereof, I desire to emphasize the fact that many modifications may be resorted to in a manner limited only by a just interpretation of the following claims.

I claim as my invention:

1. In a device of the class described for use on a robot airplane, means for injecting a smoke producing fluid into the exhaust pipe of an internal combustion engine, means for energizing and controlling said injection means comprising an electrical circuit having pairs of circuit closing contacts arranged in series in said circuit, an altitude responsive bellows having means for opening one of said pairs of contacts when the airplane reaches a predetermined altitude, and an airspeed responsive bellows having means for closing the other pair of contacts when the airplane speed rises above a normal cruising speed whereby the fluid will be injected into the exhaust pipe at speeds above a normal cruising speed and at an altitude below a predetermined selected altitude.

2. In a device of the class described for use on a robot airplane, means for injecting a smoke producing fluid into the exhaust pipe of an internal combustion engine, means for energizing and controlling said injection means comprising an electrical circuit having pairs of switches arranged in series in said circuit, said switches each comprising a pivoted beam movable to close and open said circuit, an altitude responsive bellows having means for moving a respective beam to open one of said switches when the airplane reaches a predetermined altitude, and an airspeed responsive bellows having means for moving the other beam to close the other of said switches at a predetermined air speed of the airplane above a normal cruising speed whereby the fluid will be injected into the exhaust pipe at speeds above a normal cruising speed and at an altitude below a predetermined selected altitude.

3. In a robot airplane, means thereon for producing a smoke stream signal to indicate from the ground more clearly the position of the airplane, said means comprising an electrical circuit for energizing and controlling the signal producing means, pairs of circuit-closing contacts arranged in series in said circuit, an altitude responsive bellows having means for opening one of said pairs of contacts when the airplane reaches a predetermined altitude, and an airspeed responsive bellows having means for closing the other pair of contacts when the airplane speed rises above a normal cruising speed whereby the smoke signal will be produced at speeds above a normal cruising speed and at an altitude below a predetermined selected altitude.

JAMES B. KENDRICK.